United States Patent [19]

Gould et al.

[11] 3,996,403

[45] Dec. 7, 1976

[54] STRAPPING JOINT AND METHOD AND APPARATUS FOR FORMING SAME

[75] Inventors: Russell J. Gould, Arlington Heights; Karl Adams, Schaumburg, both of Ill.

[73] Assignee: Signode Corporation, Ohio

[22] Filed: Nov. 25, 1974

[21] Appl. No.: 526,893

[52] U.S. Cl. .............................. 428/198; 53/198 R; 100/6; 100/33 PB; 428/60; 428/195; 428/296; 428/194; 428/910
[51] Int. Cl.² ............................................ B32B 7/14
[58] Field of Search ............. 229/48 T; 428/57, 60, 428/194, 195, 198, 296, 910; 53/198 R; 100/6, 10, 29, 33 PB

[56] References Cited

UNITED STATES PATENTS

| | | | |
|---|---|---|---|
| 2,712,343 | 7/1955 | Stanton | 100/33 PB |
| 3,368,323 | 2/1968 | Wood | 156/499 |
| 3,394,045 | 7/1968 | Gould | 428/409 |
| 3,442,732 | 5/1969 | Stensaker et al. | 156/580 |
| 3,486,964 | 12/1969 | Brunlid | 428/57 |
| 3,718,526 | 2/1973 | Annis, Jr. | 156/580 |
| 3,858,503 | 1/1975 | Takahashi | 100/33 PB |

Primary Examiner—George F. Lesmes
Assistant Examiner—W. R. Dixon, Jr.

[57] ABSTRACT

A joint having improved snag resistance and peel strength is formed between overlapping end portions of a thermoplastic strap. The thermoplastic strap is formed into a loop having overlapping inner and outer end portions which are joined to one another by a resolidified thin layer of formerly melted material from each of the overlapping strap end portions. Resolidified material extends completely to an inwardly tapered end of the outer strap end portion to provide the improved joint. A resolidified mass of formerly molten material also is present in front of the tapered end to further protect it against snagging.

6 Claims, 14 Drawing Figures

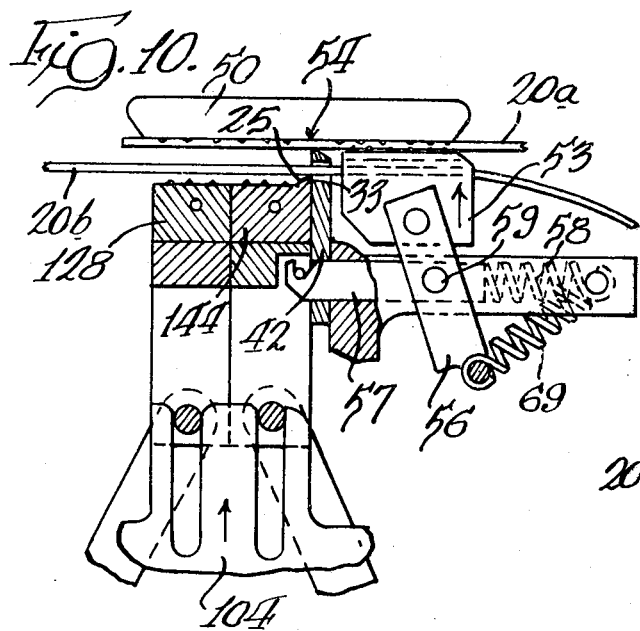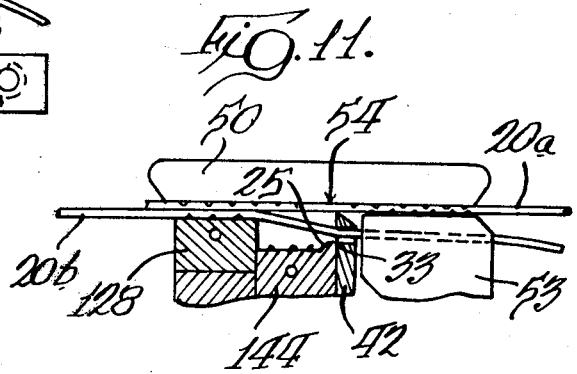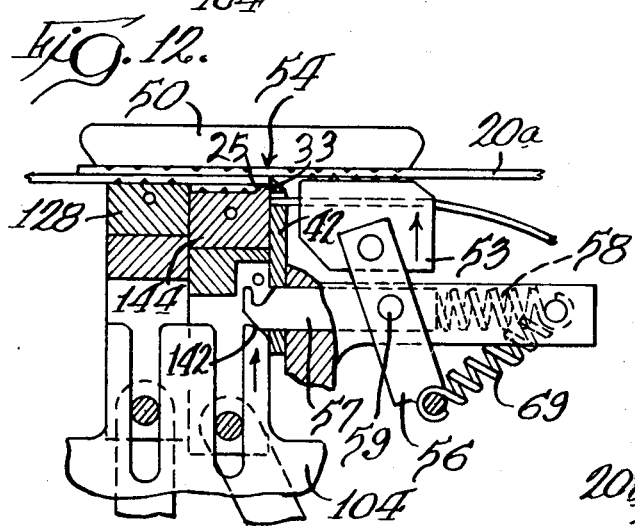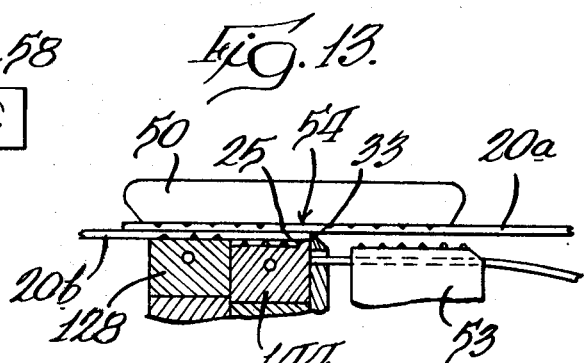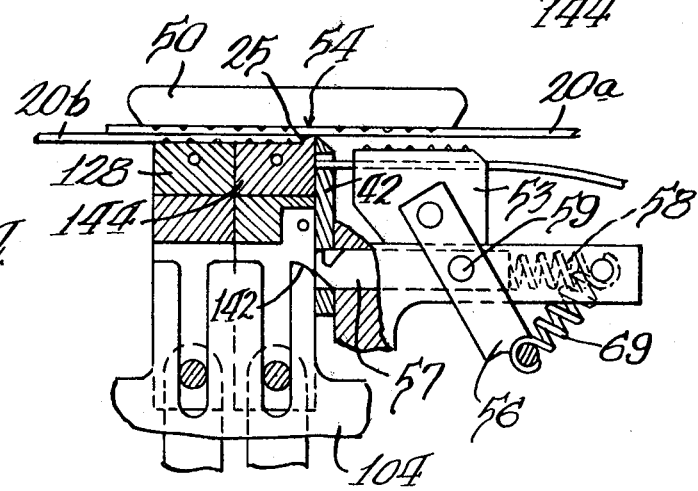

STRAPPING JOINT AND METHOD AND APPARATUS FOR FORMING SAME

BACKGROUND OF THE INVENTION

In the recent past, Signode Corporation, the assignee of the entire interest in the present application, has developed several processes, tools and power strapping machines for joining the overlapping end portions of a tensioned thermoplastic strap loop by friction-fusion techniques, and these methods and apparatuses are typified by those disclosed and claimed in U.S. Pat. Nos. 3,331,312, 3,442,203, 3,442,732, 3,442,733, 3,442,734, 3,442,735, 3,494,280, 3,586,572, 3,669,799, 3,679,519 and 3,718,526.

The thermoplastic strap material used in the practice of the inventions disclosed in the above named patents have conventionally been oriented nylon, polypropylene and polyester. Straps formed from such materials are fabricated by generally similar techniques, as is disclosed, for example, in U.S. Pat. No. 3,394,045. According to this patent, polypropylene sheet material, which is subsequently sliced into straps, is stretched to obtain planar orientation of the micromolecular chains. The molecular orientation of the polypropylene resin in the sheet substantially increases the tensile strength along the lines of orientation. However, this also renders the opposing surfaces of the sheet susceptible to abrasion which could ultimately interfere with its use in a strapping apparatus. To overcome this, the surfaces of the sheet are subjected to flash-heating to effect fusion of the outer opposing surface layers but insufficient to cause fusion in the entire thickness of the sheet. The flash heating acts to smooth the opposing surface layers, but does not disrupt the molecular orientation of the rest of the sheet material so that the high tensile strength is retained.

The formed sheet material is then sliced to produce straps. Slicing is done generally parallel to the molecular lines of orientation so that the straps have high tensile strength along their length. This makes excellent straps for use in the packaging of materials where a strap is drawn tightly around a package with overlapping end portions secured to each other in the form of a ligature.

One of the characteristics of friction-fushed joints formed in accordance with the teachings of the above patents is their exceptional tensile strength (i.e., resistance to forces applied in the direction of the length of the strap), which approaches the tensile strength of the thermoplastic strap itself. A further characteristic of such joints is that the peel strength (i.e., resistance to forces applied normally to the length of the strap) is relatively low which enable the strap to be readily removed from the strapped article, when desired. Although the low peel strength of friction-fused joints is more useful in enabling the strap to be removed from the strapped article, on occasion it may also result in unintentional openings of the joint. For example, if the end of the outermost strap portion is snagged in the handling of the article, the joint could peel open.

A friction-fushed joint having a truly snag resistant outer overlapping end has not heretofore been developed. Prior art efforts to reduce snagging of the outer end of a friction-fused joint formed in overlapping portions of a thermoplastic strap tensioned about an article have been directed toward cutting the outer end off close to the joint. This, however, still leaves a very small loose end that can cause peeling if snagged.

SUMMARY OF THE INVENTION

The present invention is directed to a joint having improved snag resistance and peel strength formed in the overlapping end portions of a thermoplastic strap, and to a method and apparatus for forming the improved joint.

According to the invention, thermoplastic strap from a strap supply is passed around the article to be strapped and drawn tightly into a loop having overlapping inner and outer end portions. The end portions are then joined to one another by a resolidified thin layer of formerly melted material from each of the overlapping strap end portions such as by friction-fusion or hot-knife techniques. The resolidified material extends completely to the end of the outer strap end portion to provide the improved joint. The outer strap end portion tapers inwardly, and a mass of molten material occurs outside the weld in front of the tapered end so as to present a substantially smooth surface therewith that is highly snag resistant, Molecular lines of orientation in the strap material extending lengthwise along the strap are also turned inward at the tapered end. This increases the peel strength of the joint because any peeling action would have to cross these lines of orientation which are protected by a flame-treated smooth surface layer of unorientated material. In addition, peel strength is increased by uneven thickness of the resolidified material forming the improved joint which reduces the possibility of peeling from cracks propagating into the body of the strap along the laminar layers thereof. The inner strap end portion extends beyond the joint to provide a zipper-like tab to be used in intentionally breaking the joint.

The improved joint is formed utilizing a friction-fusion process by positioning overlapping portions of a thermoplastic strap between a pair of welding jaws having opposing strap-gripping surfaces. One of the jaws includes a protrusion which extends above the strap-gripping surface formed at an end of the jaw perpendicular to the strap length. The gripping surface of the other jaw is made smooth in the area opposing the protrusion.

In operation, the jaw having the protrusion is moved perpendicularly with respect to the other jaw so that the protrusion engages the adjacent overlapping strap portion prior to engagement by the remainder of the strap-gripping surface. Initially, the protrusion and the smooth gripping surface of the other jaw opposing the protrusion compress the overlapping strap portions therebetween in heat generating frictional engagement, while the remainder of the overlapping strap portions between the jaws are gripped by adjacent gripping surfaces. During this time, the jaw opposite to the jaw having the protrusion is moved in a direction generally parallel to the strap-gripping surfaces to initiate interface melting between the surfaces of the compressed overlapping strap portions in alignment with the protrusion. The generally perpendicular movement of the jaws toward each other is continued until the remainder of the overlapping strap portions between the jaws are compressed into heat generating frictional engagement. The generally parallel movement of the jaws is continued to expand the interface melting to the facing surfaces of the remaining overlapping strap portions between the jaws.

The particular shape and size of the protrusion extending from one of the strap-gripping surfaces causes the strap portion adjacent to the protrusion to melt such that it tapers into the joint.

According to one aspect of the present invention, the protrusion also forms part of a strap cutter mechanism that severs the adjacent outer overlapping strap portion along the protrusion prior to interface melting. During the formation of the joint, the edge of the severed strap is engaged by the protrusion causing it to melt and taper inwardly.

It should be understood that the present invention is not limited to the protrusion forming part of a strap cutting mechanism that severs the outer overlapping strap along the protrusion prior to interface melting. Thus, according to another aspect of the invention, the overlapping strap portion adjacent the protrusion is cut down-stream from the protrusion so that after the friction-fused joint is formed, a loose end remains. This loose end extends from the tapered outer end of the friction-fused joint formed by the protrusion to the end of the outer strap. Interface melting of the outer strap adjacent the protrusion tapers the outer strap into the joint and tends to make the connection with the loose end very brittle with the result that any snagging of the loose end will break it off leaving only the snag-resistant tapered end.

According to yet another aspect of the present invention, the protrusion is dimensioned such that it causes the strap portion leading to the strap supply to melt to an extent that it is severed from the strap supply, thereby eliminating the need for a separate cutting mechanism.

The jaw of a pair of jaws used to form the joint according to the present invention has a protrusion extending outwardly from a portion of the gripping surface. The protrusion is formed on an end of the jaw perpendicular to the strap length. The shape and size of the protrusion can vary. For example, it can comprise a curved surface that extends outwardly from the gripping surface of the jaw and tapers at an edge located perpendicularly above the edge of the jaw. The edge of the protrusion can serve as part of the strap cutting mechanism as will be explained in detail later. The protrusion can also be in the shape of a flat surface extending upwardly at an angle from the gripping surface of the jaw and terminating at an edge perpendicularly above the edge of the jaw. In addition, the shape of the gripping surface itself can be varied. For example, the surface can be planar such as shown in U.S. Pat. No. 3,442,733, or the gripping surface may be curved as shown in U.S. Pat. No. 3,494,280.

Any of the friction-fusion apparatuses disclosed in the earlier mentioned patents, having their jaws modified according to the invention, can be used to form the joint according to the present invention having improved snag resistance and peel strength. For purposes of illustration, the modified jaws are described below as embodied in the machine disclosed in U.S. Pat. No. 3,442,203. However, it is noted that the modified jaw arrangement according to the present invention is not limited to use with only the above named patents, but can be used with other strapping apparatuses that form joints by hot-knife techniques as will be described later. The type of motion imparted to the modified jaws to form the joint according to the invention is not limited, but may comprise a variety of different forms such as rotary, reciprocal, or lateral movement. And as stated above, the shape of the gripping surfaces of the jaws may vary within the scope of the invention.

BRIEF DESCRIPTION OF THE DRAWINGS

FIGS. 4–6 are sequential schematic views showing one embodiment of the opposing jaw members according to the present invention for forming the friction-fused joints having improved peel strength;

FIG. 7 is a cross-sectional view showing another friction-fused joint according to the present invention having improved peel strength;

FIG. 8 is a perspective view of a jaw member showing another embodiment of the protrusion according to the present invention used in forming the friction-fused joint having improved peel strength;

FIG. 9 is a cross-sectional view of another embodiment of the present invention showing a pair of opposing jaw members for forming the friction-fused joint having improved peel strength; and FIGS. 10–14 are sequential views showing a portion of a prior art strapping tool mechanism incorporating the modified jaws of the present invention starting from when the inner strap end is maintained in place against the vibrator by a temporary holding gripper through the various steps until the overlapping strap ends are pressed into tight frictional engagement between the vibrator and a tandem pair of gripping jaws, free of any other holding members.

DETAILED DESCRIPTION

In the exemplary embodiments that follow, the improved joint of the present invention is primarily shown as being formed in overlapping end portions of a thermoplastic strap by a friction-fusion process, although it can be formed by a hot-knife process equally as well.

Figure 1:
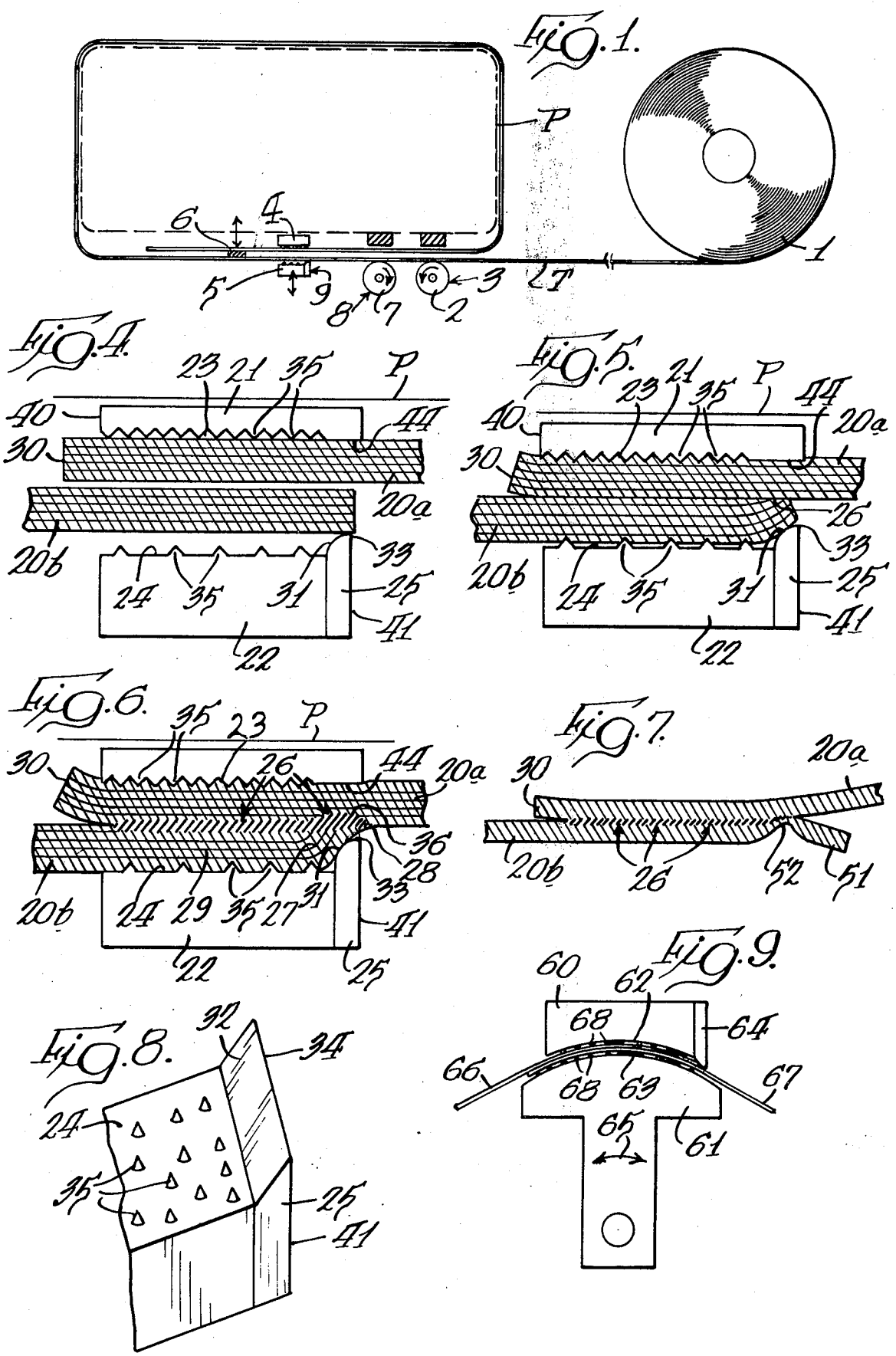
FIG. 1 is a schematic cross-sectional view of a conventional machine in which the improved sealing apparatus of the present invention may be used.

Referring now to the drawings, there is shown in FIG. 1 a schematic view of a conventional strap feeding, tensioning and sealing apparatus for forming a ligature around an article in which the present invention can be incorporated. Orientated thermoplastic strap material T is drawn from a strap supply 1 by a feed mechanism 2 including a feed wheel 3 that rotates counterclockwise as shown to move the end of strap T between jaws 4 and 5 opposing strap gripping surfaces, around article P with the aid of strap guide tracks (not shown), back through the jaws 4 and 5 and on through a gripping jaw mechanism 6. The gripping jaw mechanism 6 operates to clamp the end of the strap T and hold it stationary. A tensioning mechanism 7 includes a tensioning wheel 8 which is rotated clockwise, as shown, to move the strap in reverse direction. With the end of the strap T fixedly held by the gripping jaw mechanism 6, the movement of the strap T by the tensioning wheel 8 draws the strap T tightly around the package P to be strapped and hold it under tension. It is noted that the feed and tension mechanisms 2 and 7 can be integrated into a single mechanism as is disclosed in U.S. Pat. No. 3,442,203. Jaws 4 and 5 are then moved generally perpendicularly towards each other compressing the overlapping portions of strap T lying therebetween. While in strap compressing engagement, the jaw 4 is vibrated in a direction generally parallel to the strap gripping surfaces to induce sliding frictional movement between the compressed overlapping strap portions causing the interface regions thereof to melt. The generally parallel movement of the jaws 4 and 5 is stopped and the melted interface regions of the overlapping strap portions resolidify to form a friction-fused joint securing the tensioned overlapping strap portions together. The strap T is severed from the supply strap by cutter means (not shown) and the ligature is formed.

The present invention is directed to improving the snag resistance and peel strength of friction-fused joints formed in overlapping portions of molecularly oriented thermoplastic strap tensioned about an article by means of a protrusion 9 extending outwardly from the gripping surface of jaw 5. Conventional friction-fused joints are apt to be unintentionally opened because of their susceptibility to snagging. It has been found that while the longitudinal molecular orientation of conventional thermoplastic strapping materials contributes to significantly improved tensile strength, there is a tendency for such materials to delaminate along the plane of orientation when subjected to peeling forces.

Figure 2:
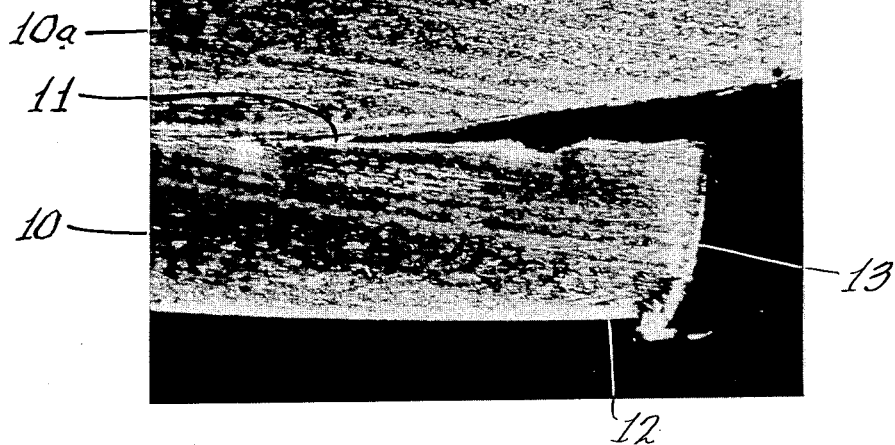
FIG. 2 is a scaled black and white reproduction of a color photomicrograph taken of a conventional friction-fused joint.

FIG. 2 sows a cross-sectional view of a conventional friction-fused joint formed in overlapping end portions of oriented polypropylene thermoplastic strap tensioned about an article. Overlapping end portions 10 and 10a are friction-fused to one another by a resolidifier layer 11 of formerly melted material. Outer strap end 12 has a blunt edge 13 where it was severed by cutting means of the strapping tool that formed the joint. Resolidified layer 11 is spaced inwardly from edge 13 so that the outer strap end 12 is free of the adjacent underlying loop. Because of the exposed unsecured strap end, the joint is in danger of being snagged and peeled open. Also, the free edge 13 exposes the laminar structure of the strap, increasing the susceptability of peeling.

Figure 3:
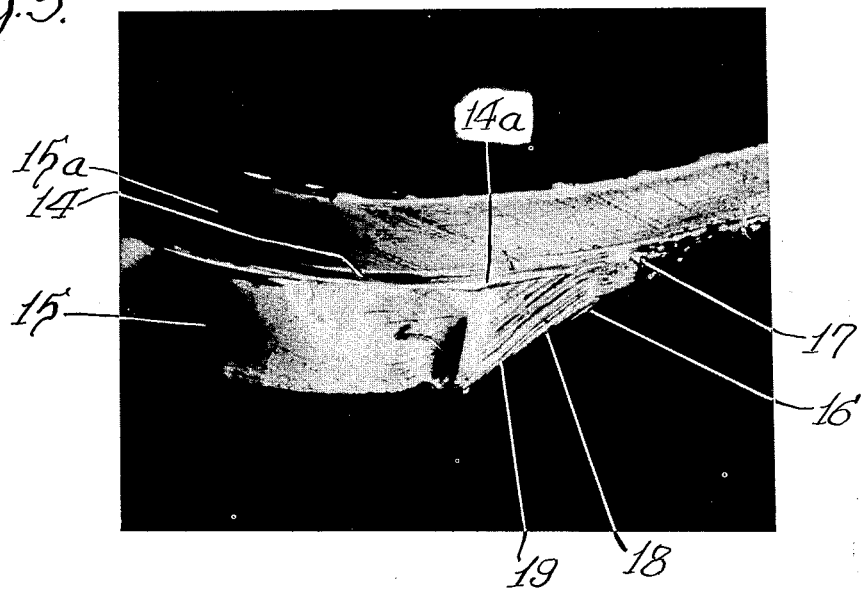
FIG. 3 is a corresponding reproduction from a friction-fused joint according to the present invention having improved snag resistance and peel strength.

Turning now to FIG. 3, there is shown a cross-sectional view of a friction-fused joint according to the present invention having improved snag resistance and peel strength. A friction-fused joint 14 of resolidified material is formed between adjacent overlapping end portions 15 and 15a of an oriented polypropylene thermoplastic strap tensioned around an article. It is noted that other oriented plastic strapping material, for example, made of nylon or polyester, can also be employed in the present invention. The resolidified interface layer 14 extends completely to the end of outer strap end 16 eliminating the free end that is present in prior art joints, thus making the improved joint highly resistant to snagging. Outer end 16 of overlapping strap portion 15 is gradually reduced in thickness and tapers inwardly toward underlying strap portion 15a. A mass of unoriented resolidified material 17 is present outside joint 14 in front of tapered end 16 and further protects it from being snagged.

The lines of orientation (indicated at 18) running along the length of the strap turn inward at tapered end 16 thereby adding to the peel strength of the friction-fused joint 14 by forcing any peeling action to cut across the molecular orientation of the strap material which are protected by a smooth surface layer 19 of flame treated unoriented material. In addition, the peel strength is increased by the uneven thickness of the resolidified material (shown at 14a) that forms the friction-fused joint 14 which reduces peeling from cracks propagating in the body of the strap along laminar lines of orientation 18.

The method of formation of the improved joint according to the invention can best be understood by referring to FIGS. 4–6. In FIG. 4, overlapping the strap portions 20a and 20b of oriented thermoplastic strap formed into a loop and tensioned about an article P are shown positioned between a pair of opposed welding jaws 21 and 22. Overlapping strap portion 20a is positioned between the jaws 21 and 22 so that its end 30 extends beyond the edge 40 of the jaw 21. Outer overlapping strap portion 20b is shown positioned between jaws 21 and 22 so that its end extends only up to the edge 41 of jaw 22. The jaws 21 and 22 have opposing planar strap gripping surfaces 23 and 24 adapted to engage the overlapping portions 20a and 20b. While jaws 21 and 22 have essentially flat and parallel strap gripping surfaces, it is not intended that the term "planar" as used herein, and in the appended claims, be limited thereto; and instead, the term "planar" is intended to include surfaces that are generally complementary to one another, such as the arcuate surfaces hereinafter described in connection with FIG. 9. Teeth 35 are provided on the surfaces 23 and 24 to engage the strap material to prevent slippage. At one end of the jaw 22, perpendicular to the length of overlapping strap portions 20a and 20b, a protrusion 25 is provided that extends outwardly from the plane of the teeth on the gripping surface 24. Protrusion 25 is illustrated as having a curved surface 31 that extends upwardly from across gripping surface 24 and tapering at an edge 33 perpendicularly above the edge 41 of jaw 22. Protrusion 25 may be formed integrally with jaw 22, or may be a separate part suitably secured thereto.

Turning to FIG. 5, the first stage in the formation of the friction-fused joint according to the invention will be described. Jaw 22 is moved perpendicularly towards jaw 21 until the overlapping strap portions 20a and 20b are compressed into heat generating frictional engagement between protrusion 25 and a portion 44 of gripping surface 23 immediately opposite protrusion 25. Gripping surface portion 44 is smooth and disposed in the plane of the teeth 35 on jaw 21 to provide a solid continuous reaction surface for protrusion 25. During the time that overlapping strap portions 20a and 20b in alignment with protrusion 25 are held under pressure, jaw 21 is vibrated at high speed in a direction generally parallel to the gripping surfaces 23 and 24. It is understood that the remainder of the overlapping strap portions 20a and 20b between jaws 21 and 22 at this time are compressed to the extent that teeth 35 penetrate the strap portions to enable jaw 21 to shift strap portion 20a relative to strap portion 20b, but not to cause frictional heat generation during vibration. This results in melting at the compressed interface 26 (FIG. 5) in alignment with the protrusion 25. As best seen in FIG. 6, the bottom edge of outer overlapping strap portion 20b melts during this operation due to the clamping pressure exerted by jaws 21 and 22 and the pressure concentration at the interface layer caused by protrusion 25. This also causes the top edge of strap portion 20b to turn inwardly as shown at 27. As jaw 21 continues to move toward jaw 22, the remainder of the overlapping strap portions 20a and 20b between the gripping surfaces 23 and 24 are compressed into heat generating frictional engagement while vibration of jaw 21 is continued so that interface melting 26 expands to the remainder of the overlapping surface portions 20a and 20b between the gripping surfaces 23 and 24. The increased pressure attributable to protrusion 25 forces a mass of molten material 28 outside of the friction-fused joint as the edge of outer overlapping strap portion 20b melts and tapers inwardly and also causes the thickness of the layer of interface melting 26 to become uneven (as shown at 36) adjacent the protrusion 25.

After interface melting occurs throughout the engaged overlapping surface portions 20a and 20b, vibration of jaw 22 is stopped and the molten interface material 26 resolidifies to form a friction-fused joint. The resolidified material 26 extends completely to the edge of outer overlapping strap portion 20b which tapers into the friction-fused joint to present a substantially snag resistant outer edge. The tapered edge 27 is further protected by the resolidified mass of molten material 28 that spread outside the joint as the edge of the outer overlapping strap portion 20b was melted away. This material 28 occurs directly in front of the tapered edge 27 further protecting it from being snagged.

It is noted that the vibration of jaw 21 as discussed above is only illustrative of the invention. The protrusion 25 could be positioned on jaw 21 instead of jaw 22. Further, the movement between the jaws 21 and 22 to effect the friction-fused joint is not limited to any one kind of movement, but may for example, include rotary, lateral, or reciprocal movement.

Inner strap end 30 of overlapping strap portion 20a extends beyond the leading edge of jaw 21 so that after the friction-fused joint is formed in the overlapping strap portions 20a and 20b, the end portion 30 provides a manually grippable tab to be used to pull the joint open. This tab is protected from snagging by the overlapping strap portion 20b on the one side and by the article being strapped on the other side. To use the tab 30, the friction-fused joint is rotated about its longitudinal axis so that the tab 30 can be grasped to pull the friction-fused joint apart.

Outer strap portion 20b is shown as terminating adjacent protrusion 25 prior to formation of the friction-fused joint, which is the result of a strapping tool cutter mechanism positioned on the strapping tool that forms the friction-fused joint, as is hereinafter explained in greater detail. There is shown in FIG. 7 another aspect of the invention where the outer overlapping strap portion 20b is shown terminating well beyond protrusion 25 so that a loose end 51 remains after the friction-fused joint is formed. The formation of the friction-fused joint in FIG. 7 is the same as described in the embodiment of FIGS. 4–6 and need not be discussed. The only difference is that after the joint is formed the loose end 51 remains. However, the interface melting of outer overlapping strap portion 20b beneath protrusion 25 during the formation of friction-fused joint 26 weakens the connection with loose end 51 making it very brittle. The result of this is that if the loose end 51 is snagged, it will break off leaving only a snag resistant tapered outer end 52 much like the snag resistant end 27 in the embodiment of FIGS. 4–6.

Alternatively, the protrusion 25 can be dimensioned s that it causes the strap portion leading to the strap supply to melt to such an extent that it is severed from the strap supply, thereby eliminating the need for a separate cutting mechanism.

The height of protrusion 25 can vary within the scope of the invention and generally depends on the thickness of the strap being used and the amount of increase in peel strength desired. For example, a friction-fused joint formed in polypropylene strap 7/16 in. wide and 0.017 in. thick having a nominal peel strength of 2.3 kgs./7/16 inch width was increased to 4.9 kgs./7/16 inch width when welded using a jaw having a protrusion extending 0.018 in. above the base of the gripping surface. In another example, a friction-fused joint formed in polypropylene strap 7/16 in. wide and 0.026 in. thick having a nominal peel strength of 1.8 kgs./7/16 inch width was increased to 8.0 kgs./7/16 inch width when welded with a jaw having a protrusion extending 0.029 in. above the base of the gripping surface. And, friction-fused joints formed in accordance with the teachings of the present invention have such improved snag resistance, that special techniques are necessary in order to evaluate peel strength properties. With some materials, e.g. nylon, the increase in peel strength is not as dramatic as in polypropylene; however, the resistance to snagging is improved to such a degree that accidental opening of the joint is effectively eliminated.

In the embodiment of FIGS. 4–6, protrusion 25 is shown as including a curved surface 31 extending upwardly from the flat portion of gripping surface 22 and tapering at a sharp edge 33 above the edge 41. The shape of the protrusion contributes to the shape of the tapered edge of outer overlapping strap portion 20b during the formation of the friction-fused joint. The sharp edge 33 on protrusion 25 can be used to form part of the strapping tool cutting mechanism as will be discussed in greater detail below. The protrusion 25 is not limited to the curved surface shown in FIGS. 4–6, but may take on other shapes. For example, in another embodiment of the present invention shown in FIG. 8, protrusion 25 includes a flat surface 32 angling upward from the flat portion of gripping surface 24. Surface 32 terminates in a sharp edge 34 located perpendicularly above the edge 41 of jaw 22. Like edge 33 in the embodiment of FIGS. 4–6, edge 34 can be used to form part of the strapping tool cutting mechanism as will be described below.

In addition, the shape of the gripping surfaces 23 and 24 of jaws 21 and 22 is not limited to the generally flat shape shown in the embodiment of FIGS. 4–6, but can take on other forms. In the embodiment shown in FIG. 9, a pair of welding jaws 60 and 61 are depicted as having complementary opposing arcuate gripping surfaces 62 and 63 having teeth 68 adapted to engage overlapping end portions 66 and 67 of thermoplastic strap tensioned about an article similar to that shown in U.S. Pat. No. 3,494,280. According to the invention, a protrusion 64 extends outwardly from across the end of gripping surface 62 perpendicular to the length of overlapping strap portions 66 and 67. The portion of gripping surface 63 opposite protrusion 64 is smooth and disposed in the plane of the teeth 68 on jaw 60 to provide a solid continuous reaction surface for protrusion 64. The actual formation of the joint according to the present invention having improved snag resistance and peel strength proceeds in the same manner as described in the embodiments of FIGS. 4–6 and therefore, is not reiterated here. Suffice it to say that jaws 60 and 61 are moved perpendicularly towards each other to first engage the portion overlapping strap portions 66 and 67 beneath protrusion 64. Jaw 61 is then moved at a high speed in a rocking motion indicated generally at 65 to induce interface melting between the overlapping strap portions 66 and 67 beneath protrusion 64, and then is expanded to the entire surface of overlapping portions 66 and 67 between jaws 60 and 61.

To facilitate an understanding of the invention, the jaw arrangement according to the present invention is shown incorporated in a machine like that disclosed in U.S. Pat. No. 3,442,203 to Kobiella. FIGS. 10–14 are sequential views of a portion of the Kobiella apparatus incorporating the jaws of the present invention in a sequence starting from when the inner strap end 20a is maintained in place against a vibrator 50 by a temporary holding gripper 53 through the various steps until the overlapping strap ends 20a and 20b are pressed into tight frictional engagement between the vibrator 50 and a tandem pair of gripping jaws 128 and 144, free of any other holding members. It is understood that the apparatus as disclosed in U.S. Pat. No. 3,442,203 functions exactly as disclosed therein and that which is not shown is incorporated herein by reference. Gripping jaw 144 is modified according to the teachings of the present invention to include a protrusion 25 that extends upwardly from the flat portion of the gripping surface. The portion of the gripping surface of vibrator 50 opposite the protrusion 25 is smooth (shown at 54). The protrusion 25 is shown as comprising a curved surface extending upwardly from the gripping surface of the jaw member 144 perpendicular to the length of the strap 20b and tapering at a sharp edge 33 perpendicularly above the edge of jaw member 144.

Turning to FIG. 10, an end 20a of thermoplastic strap is shown clampingly engaged to vibrator 50 by gripper 53. The strap is drawn around a package (not shown) and reappears as strap 20b extending under a vibrator 50 to suitable tensioning means (not shown). In FIG. 10, jaw members 128 and 144 are shown out of engagement with overlapping strap ends 20a and 20b and gripper 53 in engagement with the strap end 20a to maintain it against vibrator 50. A toggle plate 104 is moved upwardly by means not shown. Jaw member 128 is first moved into engagement with strap end 20b to urge it and strap end 20a into clamping engagement with jaw member 128 and vibrator 50 (FIG. 11). Further movement of the toggle plate 104 moves the jaw member 144 into the position shown in FIG. 12 where the sharp edge 33 of protrusion 25 in conjunction with cutter 42 severs the strap from end 20b. At this time gripper 53 is still in contact with strap end 20a. It is noted that the upward moement of toggle plate 104 brings sloped surface 142 thereof into engagement with rod 57 to move it to the right against the action of spring 58. This movement of rod 57 carries with it pivot pin 59 which effectively acts with the assistance of spring 69 to rotate link 56 and associated gripper 53 in a counterclockwise direction out of engagement with strap end 20a.

At the completion of the outward stroke of toggle plate 104, the jaw member 144 is biased in pressure engagement with overlapping strap portions 20a and 20b between the protrusion 25 and the portion of vibrator 50 surface opposite protrusion 25 (FIG. 14). The various parts are then in position to effect the forming of the friction-fused joint between strap ends 20a and 20b.

The pressure exerted by jaw member 128 and protrusion 25 on jaw member 144 causes strap portions 20a and 20b to be firmly squeezed together and strap portion 20a to be forced against the gripping surface on vibrator 50. When the straps have been gripped together under substantial pressure, the vibrator 50 is oscillated to move strap 20a relative to the inside strap portion 20b, which is held there squeezed against by the jaw member 128 and protrusion 25 on jaw 144. Interface melting between the adjacent overlapping strap portions 20a and 20b between jaw member 128 and vibrator 50 occurs as disclosed in U.S. Pat. No. 3,442,203. The sequence of interface melting between jaw member 144 and vibrator 50 functions the same as disclosed in connection with the embodiment of FIGS. 4–6 to form a friction-fused joint having improved peel strength. Interface melting between the portion of strap 20a and 20b adjacent the protrusion 25 causes the end of strap 20b to turn into the joint. The remainder of the overlapping strap portions 20a and 20b between jaw member 144 and vibrator 50 are brought into engagement and interface melting expands to the surfaces therebetween. After a sufficient time period to complete interface melting, the oscillation of vibrator 50 is stopped allowing the interface melting region to resolidify. A friction-fused joint is then formed extending between the overlapping portions 20a and 20b between jaw members 128, 144 and vibrator 50 with the outer end of overlapping portion 20b having improved peel strength in the form of that substantially shown and described above in the embodiments of FIGS. 4–6.

The improved joint according to the present invention can also be formed by a hot-knife process such as is disclosed in U.S. Pat. No. 3,368,323. According to this technique, a knife-like blade is inserted between overlapping end portions of a tensioned thermoplastic strap. The strap portions with the knive-like blade therebetween are then compressed between a pair of opposing jaws similar to that described above. However, instead of vibrating the jaws in a direction generally parallel to each other to induce frictional melting between the overlapping strap portions, the knive-like blade is heated to a sufficient degree to cause the adjacent overlapping strap portions to melt. At this time, the knive-like blade is removed from between the overlapping strap portions in a direction generally parallel to the plane of the strap surfaces, allowing the melted interface regions of the overlapping strap portions to contact each other. As the melted interface material resolidifies, it fuses together to form a joint.

The improved joint of the present invention is formed utilizing the aforesaid hot-knife process by positioning a protrusion on the end of one of the opposing jaws in like manner to that shown and described above. It is noted that the protrusion could also be positioned on the knife-like blade. As the opposing jaws are compressed, the protrusion places additional pressure on the overlapping strap portion adjacent the protrusion causing it to melt and taper inwardly, resulting in an improved joint similar to the one described above in connection with the friction-fusion process.

It will be readily observed from the foregoing detailed description of the invention and in the illustrated embodiments thereof that numerous variations and modifications may be effected without departing from the true spirit and scope of the novel concepts and principles of this invention.

We claim:

1. A molecularly oriented thermoplastic strap formed into a loop having overlapping inner and outer end portions, said end portions being fused to one another by a resolidified thin layer of formerly melted material from each overlapping strap end portion, said resolidified material extending completely to the end of the outer strap end portion characterized by said outer end portion having a tapered end producing a reducing taper toward said inner end portion, said reducing taper having an outer edge that forms part of said resolidified thin layer to provide a joint having improved snag resistance.

2. A thermoplastic strap according to claim 1, wherein a resolidified mass of formerly melted material occurs in front of said outer edge and further protects the outer strap end portion from being snagged.

3. A thermoplastic strap according to claim 1, wherein molecular lines of orientation extend along the length of the thermoplastic strap and are turned inwardly at said tapered end to increase the peel strength of the joint.

4. A thermoplastic strap according to claim 3, wherein the molecular lines of orientation are protected from peeling forces by an outer surface layer of smooth unoriented material.

5. A thermoplastic strap according to claim 3, wherein the thin layer of resolidified material extending between the overlapping end portions is uneven in thickness to further increase the peel strength of the joint.

6. A thermoplastic strap according to claim 1, wherein the end of the inner strap end portion extends beyond said layer of resolidified material to provide a tab for pulling the joint apart.

* * * * *